United States Patent
Coates et al.

(10) Patent No.: US 9,577,279 B2
(45) Date of Patent: Feb. 21, 2017

(54) IONOMERS AND METHODS OF MAKING SAME AND USES THEREOF

(75) Inventors: Geoffrey W. Coates, Lansing, NY (US); Kevin Noonan, Pittsburgh, PA (US)

(73) Assignee: CORNELL UNIVERSITY, Ithaca, NY (US)

( * ) Notice: Subject to any disclaimer, the term of this patent is extended or adjusted under 35 U.S.C. 154(b) by 210 days.

(21) Appl. No.: 13/991,571

(22) PCT Filed: Dec. 5, 2011

(86) PCT No.: PCT/US2011/063290
§ 371 (c)(1),
(2), (4) Date: Jul. 29, 2013

(87) PCT Pub. No.: WO2012/078513
PCT Pub. Date: Jun. 14, 2012

(65) Prior Publication Data
US 2013/0296499 A1    Nov. 7, 2013

Related U.S. Application Data

(60) Provisional application No. 61/419,846, filed on Dec. 5, 2010.

(51) Int. Cl.
| | |
|---|---|
| *H01M 8/10* | (2016.01) |
| *C08F 8/40* | (2006.01) |
| *C08F 230/02* | (2006.01) |
| *C08G 79/02* | (2016.01) |
| *C08L 85/02* | (2006.01) |
| *H01M 8/02* | (2016.01) |
| *C08G 61/08* | (2006.01) |
| *C08G 61/06* | (2006.01) |

(52) U.S. Cl.
CPC ............... *H01M 8/103* (2013.01); *C08F 8/40* (2013.01); *C08F 230/02* (2013.01); *C08G 79/02* (2013.01); *C08L 85/02* (2013.01); *H01M 8/0289* (2013.01); *H01M 8/1034* (2013.01); *C08G 61/06* (2013.01); *C08G 61/08* (2013.01); *Y02E 60/523* (2013.01)

(58) Field of Classification Search
CPC ..... H01M 8/103; H01M 8/1034; C08G 61/06; C08G 61/08; C08F 8/40; C08F 230/02
USPC .................. 525/340; 526/276, 309
See application file for complete search history.

(56) References Cited

U.S. PATENT DOCUMENTS

| | | |
|---|---|---|
| 6,339,166 B1 | 1/2002 | Allcock et al. |
| 6,462,133 B2 | 10/2002 | Wehmeyer |
| 7,705,190 B2 | 4/2010 | Brunelle |
| 2002/0022714 A1* | 2/2002 | Wehmeyer ............ 528/403 |
| 2013/0137011 A1 | 5/2013 | Coates et al. |

FOREIGN PATENT DOCUMENTS

| | | | |
|---|---|---|---|
| DE | 19748712 A1 | * | 5/1999 |
| JP | 04-252208 A | | 9/1992 |
| WO | 99/22745 A1 | | 5/1999 |

OTHER PUBLICATIONS

DE 19748712 (1999) machine translation.*
International Search Report for International Application No. PCT/US2011/063290, dated Jun. 18, 2012.
Schwesinger, et al. "Extremely Base-Resistant Organic Phosphazenium Cations" Chem. Eur. J. 2006, 12, 429-437.
Schwesinger, et al. "Stable Phosphazenium Ions in Synthesis—an Easily Accessible, Extremely Reactive "Naked" Flouride Salt" Angew. Chem. Int. Ed. Engl. 30 (1991) No. 10.

* cited by examiner

*Primary Examiner* — Roberto Rabago
(74) *Attorney, Agent, or Firm* — Heslin Rothenberg Farley & Mesiti P.C.

(57) ABSTRACT

Phosphazenium-based ionomers and methods of making them are disclosed. The ionomers are useful in making membranes for fuel cells and other devices that benefit from extremely base-stable membranes. The polymers (ionomers) contain repeating units of formula:

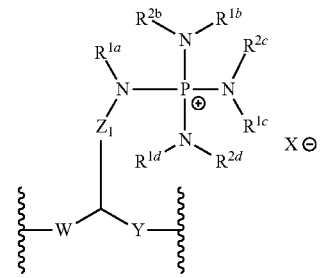

in which all of $R^1$, $R^2$, W, Y and Z are hydrocarbon.

12 Claims, No Drawings

IONOMERS AND METHODS OF MAKING SAME AND USES THEREOF

CROSS REFERENCE TO RELATED APPLICATIONS

This application is a national phase filing under 35 U.S.C. §371 of PCT International Application PCT/US2011/063290, filed Dec. 5, 2011. PCT/US2011/063290 claimed priority from U.S. Provisional Application 61/419,846, filed Dec. 5, 2010, the entire disclosure of which is incorporated herein by reference.

FIELD OF THE INVENTION

The present invention generally relates to ionomers and methods of making the same. More particularly, the present invention relates to ionomers for use in applications such as fuel cells.

BACKGROUND OF THE INVENTION

As a crucial element for separation of reactants and anion transport, anion-exchange membranes are widely used in various industrial fields, including water treatment, hydrometallurgy, chemical industry, chemical separation, and electrochemical conversion devices, including fuel cells and electrolysis cells.

Fuel cells are devices that convert the chemical energy stored in a fuel directly into electricity and could potentially serve as a highly efficient and environmentally sustainable power generation technology for stationary and mobile applications. Fuel cells are promising energy conversion devices; however, improving their performance and enhancing their durability remain significant challenges. Increasing the ionic conductivity and mechanical stability of solid polymer electrolyte membranes to achieve higher operating efficiencies are important goals. Within a fuel cell, the polymer electrolyte membrane acts as a barrier between the fuel and oxidant streams and simultaneously serves as the ion conducting medium between the anode and cathode. As a result, the membrane is a central, and often performance-limiting component of the fuel cell. Many low temperature (e.g., less than 100° C.) fuel cells employ a proton exchange membrane (PEM) as the electrolyte. The most common polymer electrolyte membrane fuel cells operate under acidic conditions and are therefore proton conducting. Nafion®, a PEM, has dominated the field due its processability, chemical and thermal stability, and proton conductivity (when properly hydrated). However, the use of these membranes is limited to acidic conditions and requires substantial dilution of carbon-based fuels (e.g., methanol) along with thicker (less efficient and more costly) membranes to prevent uncontrollable membrane swelling and fuel crossover. Additionally, PEM fuel cells rely almost exclusively on platinum, a very expensive and scarce noble metal.

A significant advantage of alkaline fuel cells (AFCs) over their acidic counterparts is greatly improved oxygen reduction kinetics as well as better fuel oxidation kinetics. These improvements can lead to higher efficiencies and enable the use of non-precious metal catalysts, greatly reducing the cost of the device. Indeed, hydrogen fueled AFCs can outperform all known low temperature (e.g., less than 200° C.) fuel cells. However, AFCs have traditionally employed liquid alkaline electrolytes containing metal hydroxides (e.g., potassium hydroxide) that react with $CO_2$ (present in oxidant stream or fuel oxidation product when using carbon-based fuels) to form metal bicarbonates and subsequently carbonate salts. If sufficiently high levels of these salts are formed, they can precipitate out of solution, decreasing electrolyte conductivity and eventually obstructing electrode pores, both of which compromise power output.

There exists an ongoing and unmet need for conductive and solvent processable ionomers, which can be used as alkaline anion exchange membranes (AAEMs).

BRIEF SUMMARY OF THE INVENTION

In one aspect, the present invention relates to polymers comprising a plurality of phosphazenium-containing repeating units (PRU) of formula:

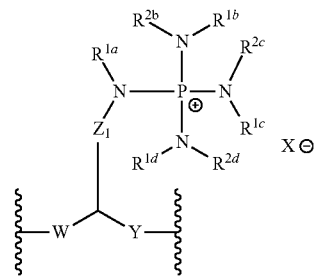

wherein $R^{1a}$, $R^{1b}$, $R^{1c}$, $R^{1d}$ (collectively $R^1$) and $R^{2b}$, $R^{2c}$ and $R^{2d}$ (collectively $R^2$) are independently chosen from H, $(C_1\text{-}C_{15})$alkyl, $(C_5\text{-}C_{10})$cycloalkyl and a point of attachment to a bivalent $(C_1\text{-}C_{20})$hydrocarbon residue; or taken together, any pair of $R^1$, $R^2$ form a 5 or 6-membered ring;
W is a direct bond or $(C_1\text{-}C_{10})$hydrocarbon;
Y is a direct bond or $(C_1\text{-}C_{10})$hydrocarbon;
$Z^1$ is chosen from a direct bond, $(C_1\text{-}C_{10})$hydrocarbon;
wavy lines indicate the points of attachment to adjacent repeating units of the polymer and
X is any counterion.

In another aspect, the invention relates to polymers comprising phosphazenium-containing repeating units (PRU) and optionally random or sequentially placed hydrocarbon repeating units (HRU), having the following structure:

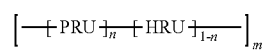

wherein n is from 0.05 to 1.0 and represents the mole fraction of PRU in the polymer;
m is an integer from 1 to 100; and
wherein the phosphazenium groups have the formula:

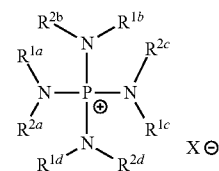

wherein $R^{1a}$, $R^{1b}$, $R^{1c}$, $R^{1d}$ (collectively $R^1$) and $R^{2a}$, $R^{2b}$, $R^{2c}$ and $R^{2d}$ (collectively $R^2$) are independently chosen from H, $(C_1\text{-}C_{15})$alkyl, $(C_5\text{-}C_{10})$cycloalkyl and a point of attachment to a bivalent hydrocarbon residue; or taken together, any pair of $R^1$ and $R^2$ form a 5 or 6-membered ring, and wherein at least one of $R^2$ is a point of attachment to a bivalent $(C_1-C_{20})$hydrocarbon residue; and X is any counterion.

In another aspect, the invention relates to membranes comprising the polymers described herein.

In another aspect, the invention relates hydrogen generation devices, fuel cells, and water purification devices comprising the polymers described herein.

In another aspect, the invention relates to compounds of formula

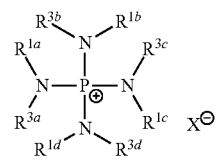

wherein $R^{1a}$, $R^{1b}$, $R^{1c}$, $R^{1d}$ (collectively $R^1$) are as defined before and $R^{3a}$, $R^{3b}$, $R^{3c}$ and $R^{3d}$ (collectively $R^3$) are independently chosen from H, $(C_1-C_{15})$alkyl, $(C_5-C_{10})$cycloalkyl and an aliphatic $(C_1-C_{15})$hydrocarbon containing a double bond in a $(C_5-C_8)$cycloalkene; or taken together, any pair of $R^1$ and $R^3$ form a 5 or 6-membered ring. At least one of $R^3$ is an aliphatic $(C_1-C_{15})$hydrocarbon containing a double bond in a carbocycle.

In another aspect, the invention relates to an electrocatalyst ink comprising a compound as described herein.

DETAILED DESCRIPTION OF THE INVENTION

The present invention provides a polymer composition, and in particular an ionomer composition, with phosphazenium functionalities. It also provides methods of making these polymer compositions. The present invention also provides phosphazenium monomers useful in the preparation of the ionomers. The ionomers of the present invention can be used, for example, in fuel cells as alkaline anion exchange membranes.

The polymers described herein contain ionic phosphazenium moieties. The polymers are desirable for use as alkaline anion exchange membranes (AAEMs) because their phosphazenium cations cannot aggregate with anions such as $HCO_3^-$ and $CO_3^-$ to form a crystal lattice. Use of these materials enables operation of fuel cells under alkaline conditions in the presence of $CO_2$. Additionally, the direction of hydroxide ion conduction opposes that of methanol fuel crossover, thereby mitigating or possibly eliminating this deleterious process. The fuel cells are constructed by methods well known in the art in which the membrane described herein can replace the anion exchange membrane of the art.

The monomers of formula

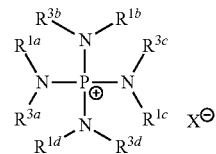

In addition to their utility in synthesizing the polymers described herein, can be used in electrocatalyst inks, as described in U.S. Pat. No. 7,754,369, the portions of which relate to the preparation of such inks are incorporated herein by reference.

In one aspect, the present invention provides polymers which contain phosphazenium repeating units (PRU) of structure:

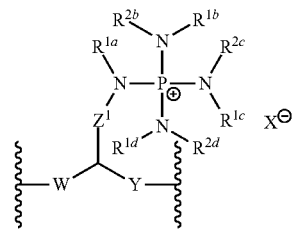

In these units, $R^{1a}$, $R^{1b}$, $R^{1c}$, $R^{1d}$ (collectively $R^1$) and $R^{2b}$, $R^{2c}$ and $R^{2d}$ (collectively $R^2$) are independently chosen from H, $(C_1-C_{15})$alkyl, $(C_5-C_{10})$cycloalkyl and a point of attachment to a bivalent $(C_1-C_{20})$hydrocarbon residue; or taken together, any pair of $R^1$ and $R^2$ form a 5 or 6-membered ring. In some embodiments, the bivalent hydrocarbon residue is of formula:

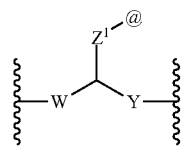

wherein @ designates the point of attachment to a nitrogen of phosphazenium. For clarity's sake, and as would be understood by the person of skill in the art, a bivalent $(C_1-C_{20})$hydrocarbon residue is a $(C_1-C_{20})$hydrocarbon from which two hydrogens have been formally removed to provide a residue having two points for covalent attachment to adjacent repeating units. To illustrate, n-octane, $CH_3$—$(CH_2)_6$—$CH_3$, is a $(C_1-C_{20})$hydrocarbon, and

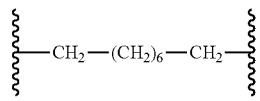

a bivalent octane residue. Similarly, ethylbenzene is a $(C_1-C_{20})$hydrocarbon, and

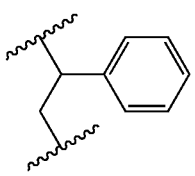 [SMILES: *CC(*)c1ccccc1]

is a bivalent residue of ethylbenzene. Finally, cyclohexane is a bivalent $(C_1-C_{20})$hydrocarbon, and

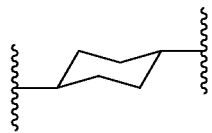 [SMILES: *C1CCC(*)CC1]

is a bivalent residue of cyclohexane. Thus, when the bivalent residue is a residue of n-octane, an example of a phosphazenium "attached to a bivalent $(C_1-C_{20})$hydrocarbon residue", would be:

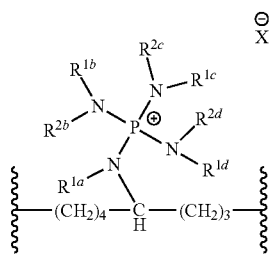

and, when the bivalent residue is a residue of ethylbenzene, an example of a phosphazenium "attached to a bivalent $(C_1-C_{20})$hydrocarbon residue", would be:

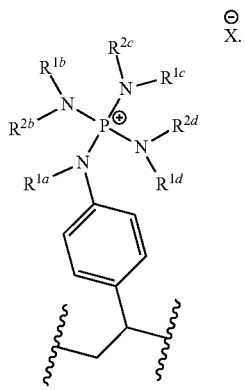

In these polymers, $Z^1$ is a direct bond or $(C_1-C_{10})$hydrocarbon; W is a direct bond or $(C_1-C_{10})$hydrocarbon and Y is a direct bond or $(C_1-C_{10})$hydrocarbon. In some embodiments, W is a direct bond or $(C_1-C_{10})$alkylene; Y is a direct bond or $(C_1-C_{10})$alkylene; and $Z^1$ is chosen from a direct bond, $(C_1-C_{10})$alkylene and phenylene. As would be understood by the person of skill in the art, alkylene refers to a bivalent alkyl group; an example would be —$CH_2CH_2CH_2CH_2CH_2CH_2CH_2CH_2$—. Similarly, phenylene refers to a bivalent phenyl:

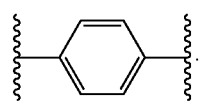 [SMILES: *c1ccc(*)cc1]

An example of a phosphazenium in which any pair of $R^1$, $R^2$ together with the nitrogen to which they are attached, form a 5 or 6-membered ring is the following, in which three pairs of $R^1$, $R^2$ together with the nitrogen to which they are attached, form 5-membered rings:

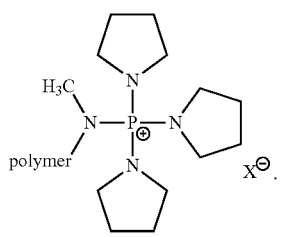

In some embodiments, all $R^1$ are methyl and all $R^2$ are chosen from $(C_1-C_{10})$alkyl, $(C_5-C_{10})$cycloalkyl and a point of attachment to a bivalent hydrocarbon residue. In some embodiments, from one to three $R^2$ are points of attachment to a bivalent hydrocarbon residue and the remainder of $R^2$ are chosen from cyclopentyl, cyclohexyl and t-butyl. In some embodiments, one or two of $R^2$ are points of attachment to a bivalent hydrocarbon residue and the remainder are cyclohexyl.

In some embodiments, $Z^1$ is a direct bond, and W may be $(CH_2)_{1-5}$ and Y may be $(CH_2)_{1-5}$. In some embodiments, $Z^1$ is a phenylene.

In polymers containing HRU, the HRU may be of formula:

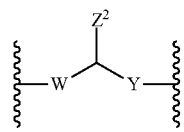

and $Z^2$ is hydrogen or $(C_1-C_{10})$hydrocarbon. In some embodiments, $Z^2$ may be chosen from H, methyl, isobutyl and phenyl. In some embodiments, W is $(CH_2)_{1-5}$ and Y is $(CH_2)_{1-5}$.

Unless otherwise specified, alkyl is intended to include linear, branched, or cyclic hydrocarbon structures. Lower alkyl refers to alkyl groups of from 1 to 6 carbon atoms. Examples of lower alkyl groups include methyl, ethyl, propyl, isopropyl, butyl, s- and t-butyl and the like. Preferred alkyl groups are those of $C_{20}$ or below. Cycloalkyl is a subset of alkyl and includes cyclic hydrocarbon groups of from 3 to 8 carbon atoms. Examples of cycloalkyl groups include c-propyl, c-butyl, c-pentyl, norbornyl and the like.

$C_1$ to $C_{20}$ hydrocarbon includes alkyl, cycloalkyl, polycycloalkyl, alkenyl, alkynyl, aryl and combinations thereof. Examples include benzyl, phenethyl, cyclohexylmethyl, camphoryl and naphthylethyl. Hydrocarbon refers to any substituent comprised of hydrogen and carbon as the only elemental constituents.

Unless otherwise specified, the term "carbocycle" is intended to include ring systems in which the ring atoms are all carbon but of any oxidation state. Thus $(C_3-C_{10})$ carbocycle refers to both non-aromatic and aromatic systems, including such systems as cyclopropane, benzene and cyclohexene; $(C_8-C_{12})$ carbopolycycle refers to such systems as norbornane, decalin, indane and naphthalene.

In some embodiments, the PRU is an element of a polymer comprising PRUs and hydrocarbon repeating units (HRU) and the polymers have the following structure:

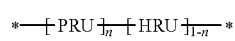

wherein n is from 0.05 to 1.0 and represents the mole fraction of PRU in the polymer; and wherein the phosphazenium groups have the formula:

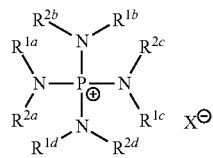

In which the R groups are as defined above. The PRU and HRU units may be random or sequentially placed. In some embodiments, n is 0.1 to 0.4.

In some embodiments, the polymer may be cross-linked. This can be accomplished either by virtue of a phosphazenium having two or more $R^2$ being points of attachment to bivalent $(C_1-C_{20})$hydrocarbon residues or by the inclusion of repeating units of formula:

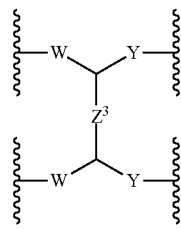

wherein $Z^3$ is a $(C_1-C_{20})$hydrocarbon. In some embodiments, $Z^3$ is phenylene or $(CH_2)_{1-20}$.

In another aspect, the invention relates to compounds of formula:

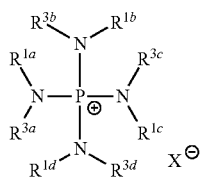

wherein $R^{1a}$, $R^{1b}$, $R^{1c}$, $R^{1d}$ (collectively $R^1$) are as defined earlier and $R^{3a}$, $R^{3b}$, $R^{3c}$ and $R^{3d}$ (collectively $R^3$) are analogous to $R^2$ except that one or more of $R^3$ is an aliphatic $(C_1-C_{15})$hydrocarbon containing a double bond in a carbocycle instead of a bivalent hydrocarbon residue. These compounds are useful as monomers from which to construct many of the polymers described above. As would be understood by the person of skill, an aliphatic $(C_1-C_{15})$ hydrocarbon is a hydrocarbon comprising from one to fifteen carbons which may contain unsaturation, but which is not aromatic. In this case there is an additional constraint that the hydrocarbon must contain at least one double bond, and the double bond must occur in a carbocycle. Examples of such $R^3$ residues are:

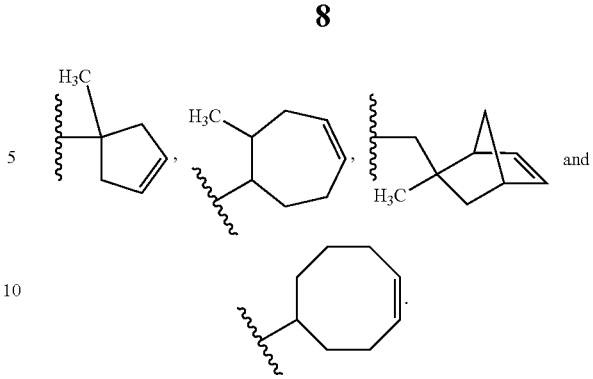

In some embodiments, the compounds have the formula:

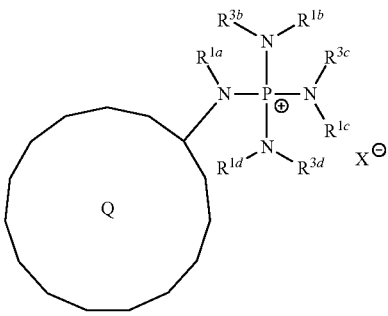

wherein Q is a $(C_5-C_8)$cycloalkene. In some embodiments, all $R^1$ are methyl and all $R^3$ are chosen from $(C_1-C_{15})$alkyl, $(C_5-C_{10})$cycloalkyl and a $(C_5-C_8)$cycloalkene. In other embodiments, from one to three $R^3$ are $(C_5-C_8)$cycloalkene; and the remainder of $R^2$ are chosen from cyclopentyl, cyclohexyl and t-butyl. In still other embodiments, all $R^1$ are methyl, one or two of $R^3$ are aliphatic $(C_1-C_{15})$hydrocarbon containing a double bond in a carbocycle and the remainder are cyclohexyl.

In all of the foregoing phosphazenium salts, the counter ions may be, for example, hydroxide, halide, bicarbonate, boron tetrafluoride, carbonate, nitrate, cyanide, carboxylate or alkoxide.

The polymers described above can be cast or otherwise formed into membranes as described below. The membranes are useful in hydrogen generation devices, fuel cells, and water purification devices.

The number averaged molecular weight of the ionomer, Mn, is from 5,000 to 2,000,000, including all integers and ranges therebetween.

The ionomers may be random or block copolymers. Adjacent PRU and HRU or PRU and PRU or HRU and HRU may be connected by a carbon-carbon single bond or a carbon-carbon double bond as illustrated in the synthesis below. When the polymer is to be used in an AAEM, the double bonds will usually be reduced, as the saturated hydrocarbon membranes seem to possess greater mechanical strength than their corresponding unsaturated congeners. In some embodiments 100% of the carbon-carbon double bounds may be reduced to carbon-carbon single bonds for preparation of membranes, but this may not be necessary. In various embodiments 50%, 75%, 90%, 95%, or 99% of the carbon-carbon double bonds in the ionomer may be reduced to carbon-carbon single bonds.

The ionomers can be crosslinked or not crosslinked. In one embodiment, the ionomers are not cross-linked. An example of an unsaturated non-crosslinked ionomer is shown in Structure I:

Structure I

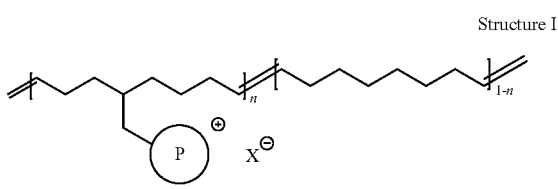

In which Ⓟ is a phosphazenium residue.

An example of a saturated non-crosslinked ionomer is shown in Structure II:

Structure II

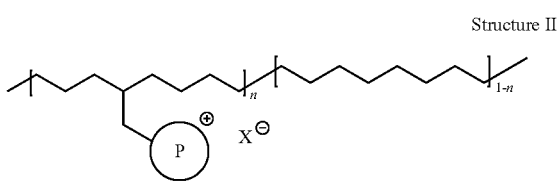

The ionomers can be synthesized by, for example, ring-opening metathesis polymerization (ROMP), which can be carried out using a transition metal (e.g., ruthenium-based) metathesis catalyst (e.g., a second generation Grubbs-type catalyst). The steps of the ROMP polymerization are known in the art. For example, the method includes the steps of providing a strained-ring monomer (or plurality of strained ring monomers) and a catalyst, such as a ruthenium-based alkene metathesis catalyst. The monomer(s) and catalyst are combined optionally in the presence of a solvent. The reaction mixture is heated under conditions such that an ionomer is formed. By strained ring structure it is meant that at least one bond angle in the molecule differs from the optimal tetrahedral (109.5°) (for sp$^3$ bonds) or trigonal planar (120°) (for sp$^2$ bonds) bond angles such that the ground state energy of the carbocycle is above that of a carbocycle having all normal bond angles.

The phosphazenium monomer (PM) from which a PRU is derived is a hydrocarbon which has at least one alkene group that can be polymerized. The PM can have multiple alkene moieties which can result in the ionomer being crosslinked as a result of polymerization of two alkene moieties from two different PM units. For example, a PM and a monomer with multiple alkene functional groups can be copolymerized to provide crosslinked ionomers.

For use as AAEMs, it is desirable that the counterion in the ionomer material be hydroxide anions. Thus, the ionomer material may be subjected to ion exchange conditions such that the non-hydroxide anions are exchanged for hydroxide anions and the resulting ionomer material has hydroxide anions.

In one aspect, the ionomer materials of the present invention can be used in devices such as, for example, fuel cells, hydrogen generators, water purification devices, and the like. In one embodiment, the present invention provides a fuel cell operating under alkaline conditions comprising an alkaline anion exchange membrane (AAEM) comprising an ionomer of Structure I.

Within a fuel cell, the ion exchange membrane serves as the conducting interface between the anode and cathode by transporting the ions while being impermeable to gaseous and liquid fuels. It is desirable that an ion exchange membrane have the four properties listed below:

(1) low methanol solubility—complete insolubility being the ideal;

(2) hydroxide conductivity of from 1 mS/cm to 300 mS/cm—hydroxide conductivities of at 1, 5, 10, 25, 50, 100, 150, 200 and 300 mS/cm being increasingly desirable;

(3) mechanical properties such that a membrane comprising an ionomer does not tear or fracture under fuel cell operating conditions; and (4) as little swelling and hydrogel formation under alkaline fuel cell conditions as possible. Swelling less than 20% of original AAEM film thickness is ideal. In one aspect, the present invention relates to an AAEM comprising an ionomer as described. The AAEM displays the desirable properties set out above. The thickness of the AAEM comprising the ionomer materials described herein can be from 1 μm to 300 μm, including all values to the 1 μm and ranges therebetween.

The following examples are presented to illustrate the present invention. They are not intended to be limiting in any manner. A phosphazenium functionalized cyclooctene was prepared in a series of synthetic steps (Scheme 1) from 5-hydroxy-1-cyclooctene. 5-Hydroxy-1-cyclooctene was converted to the mesylate, and reaction with NaN$_3$ afforded the 5-azido-1-cyclooctene. A Staudinger reaction was employed to yield phosphazene. Immediate reaction with a cyclohexylamine produced a phosphazenium salt. Methylation was conducted using standard phase transfer protocols yielding a peralkylated-phosphazenium cation suitable for ROMP:

SCHEME 1

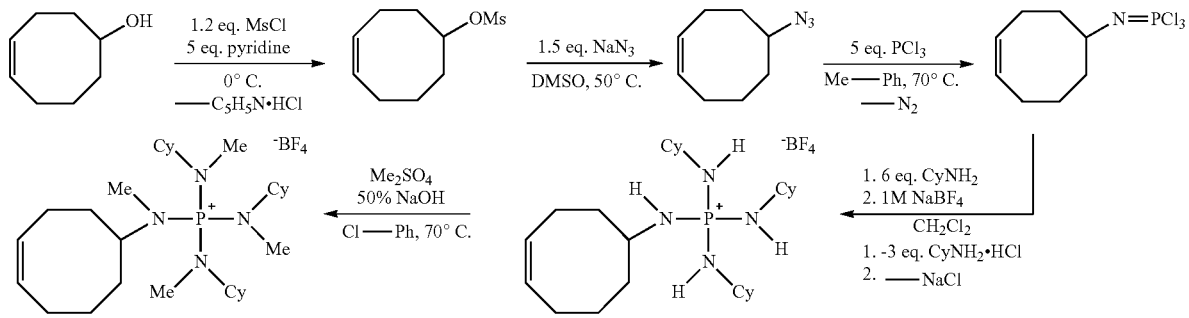

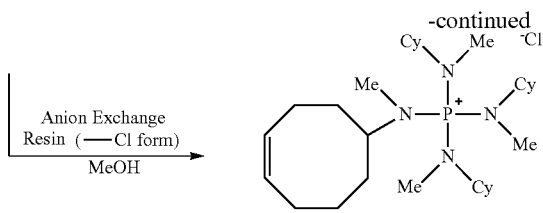

This scheme can be used to prepare analogous compounds by employing different cycloalkenols as starting materials and different amines in the displacement/elimination of the trichloride. A slight modification as shown below, provides compounds in which a pair of $R^1$ and $R^3$ on adjacent nitrogens form 5 or 6-membered rings:

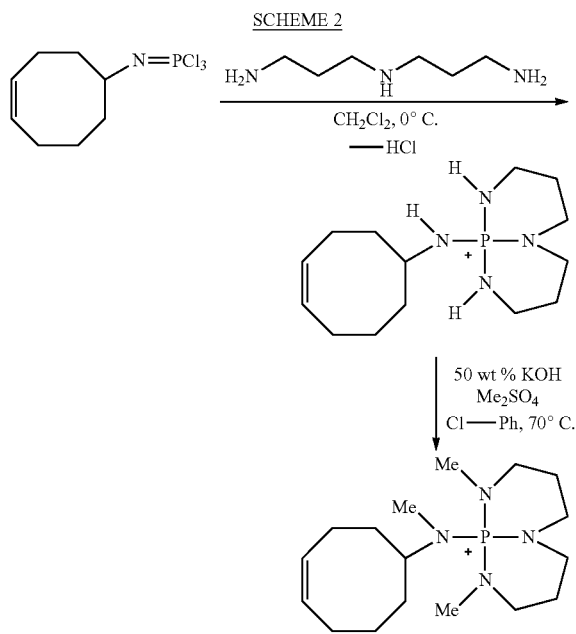

Preparation of 5-mesyl-1-cyclooctene. In a 100 mL round-bottom flask, 5-hydroxy-1-cyclooctene (5.50 g, 43.6 mmol) was combined with pyridine (17.5 mL, 217 mmol). The round-bottom flask was cooled to 0° C. using an ice bath, and methanesulfonyl chloride (4.1 mL, 53.0 mmol) was added to the reaction mixture by syringe over a period of one minute. Upon addition of the methanesulfonyl chloride, the yellow reaction mixture was stirred for 30 min at 0° C. The ice bath was then removed, the reaction mixture was warmed to room temperature and the $C_5H_5N.HCl$ precipitated from the solution. The reaction mixture was poured into 100 mL of water and the aqueous fraction was extracted three times with diethyl ether (1×100 mL and 2×75 mL portions). The organic layers were combined and washed with 100 mL of water. Finally, the organic layer was dried with $Na_2SO_4$ and removal of the solvent by rotary evaporation afforded the crude product. The crude compound was dried in vacuo to remove residual pyridine furnishing the product as a yellow oil (8.35 g, 94%). This compound was used without further purification. $^1$H NMR (400 MHz, CDCl$_3$) δ 5.69-5.59 (2H, br m), 4.80-4.74 (1H, br m), 2.96 (3H, s), 2.42-2.32 (1H, br m), 2.22-1.92 (6H, br m), 1.85-1.76 (1H, br m), 1.75-1.67 (1H, br m), 1.58-1.47 (1H, br m). $^{13}$C NMR (100 MHz, CDCl$_3$) δ 130.2, 129.3, 84.8, 38.7, 35.1, 34.5, 25.7, 24.8, 22.3.

Preparation of 5-azido-1-cyclooctene. Solid NaN$_3$ (3.82 g, 58.8 mmol) was carefully added to a solution of 5-mesyl-1-cyclooctene (8.00 g, 39.2 mmol) in 30 mL of dimethyl sulfoxide at room temperature. The 250 mL reaction vessel was fitted with a glass stopper and heated to 50° C. using an oil bath. The reaction mixture was stirred for 2 days at which point it was slowly quenched with 100 mL of water. Once the mixture had cooled to room temperature, it was extracted with diethyl ether (3×100 mL). The combined ether extracts were washed with water (1×100 mL). The organic layer was subsequently dried with Na$_2$SO$_4$ and the solvent was removed by rotary evaporation. The product was chromatographed on a short path of silica using hexanes/ethyl acetate, 19/1 (TLC analysis: $R_f$ product=0.4, $R_f$ starting material=0.1) to afford the desired azide as a colorless oil (4.57 g, 74%). $^1$H NMR (400 MHz, CDCl$_3$) δ 5.67-5.58 (2H, br m), 3.49-3.43 (1H, br m), 2.40-2.31 (1H, br m), 2.21-2.05 (3H, br m), 1.96-1.88 (1H, br m), 1.85-1.67 (3H, br m), 1.63-1.53 (1H, br m), 1.50-1.41 (1H, br m). $^{13}$C NMR (100 MHz, CDCl$_3$) δ 130.1, 129.6, 62.6, 34.0, 33.0, 26.1, 25.8, 23.2.

Preparation of 5-chloroiminophosphorane-1-cyclooctene. This reaction was conducted under an atmosphere of N$_2$. 5-Azido-1-cyclooctene (4.00 g, 26.5 mmol) was combined with 10 mL of dry toluene in a flame dried schlenk tube equipped with a magnetic stir bar. To this mixture, PCl$_3$ (11.5 mL, 132 mmol) was added by syringe with vigorous stirring. The reaction mixture was then heated to 70° C. for approximately 48 h. The entire contents of the reaction mixture were quantitatively transferred to a 50 mL round-bottom flask in the glovebox and capped with a glass stopper. The flask was removed from the glovebox and connected to a flame-dried distillation apparatus. Toluene and PCl$_3$ were removed in vacuo. Fractional distillation of the mixture afforded some crude 5-azido-1-cyclooctene (oil bath at 90° C. and stillhead temperature between 60-65° C.) and the desired product as a colorless oil (oil bath at 110° C. and stillhead temperature between 85-90° C.) in 43% yield (2.94 g). This compound was used immediately for subsequent reactions as it dimerizes upon standing at 20° C. Small amounts of (<5%) 5-azido-1-cyclooctene do not seem to affect the subsequent reaction. $^{31}$P NMR (121 MHz, C$_6$D$_6$) −72.9 (1P, d, $J_{PH}$=42.4 Hz). $^1$H NMR (400 MHz, C$_6$D$_6$) δ 5.62-5.49 (2H, br m), 3.71 (1H, d m, $J_{PH}$=43.0 Hz), 2.28-2.19 (1H, br m), 2.15-2.06 (1H, br m), 1.99-1.66 (6H, br m), 1.63-1.54 (1H, br m), 1.39-1.28 (1H, br m). $^{13}$C NMR (100 MHz, C$_6$D$_6$) δ 130.6, 129.8, 59.4 ($J_{PC}$=11.3 Hz), 38.7 ($J_{PC}$=16.3 Hz), 36.4 ($J_{PC}$=17.3 Hz), 26.4, 26.2, 24.3.

Preparation of Tris(cyclohexylamino)-cycloctenylaminophosphonium tetrafluoroborate. Crude 5-chloroiminophosphorane-1-cyclooctene (2.94 g, 11.3 mmol) was combined with dry CH$_2$Cl$_2$ (75 mL) in a 250 mL round bottom Schlenk flask equipped with a magnetic stir bar under an atmosphere of N$_2$. The solution was stirred magnetically and placed in an ice bath at 0° C. Six equivalents of cyclohexylamine (7.75 mL, 67.8 mmol) were added to the solution using a syringe and the evolution of some HCl gas was observed. Upon complete addition of the amine, the reaction mixture was kept at 0° C. for approximately 30 min at which point the ice bath was removed and the mixture was warmed to room temperature and stirred for two days. Analysis of the reaction mixture using $^{31}$P NMR spectroscopy confirmed the formation of tris(cyclohexylamino)-cycloctenylamino-phosphonium tetrafluoroborate ($\delta^{31}$P=20.5). Approximately 50 mL of wet $CH_2Cl_2$ and 100 mL of water were added to the reaction mixture. The aqueous and organic layers were separated and the organic layer was washed with a further 100 mL of water. The $CH_2Cl_2$ solution was then washed with (3×50 mL) of a 1 M $NaBF_4$ aqueous solution and a subsequent 100 mL of water. The organic layer was then dried with $Na_2SO_4$ and the solvent was removed by rotary evaporation. Residual solvents were removed from the crude product upon heating to 75° C. in vacuo for 17 hours and a white solid was obtained (5.22 g, 86%). This compound was typically used without further purification. $^{31}$P {$^1$H} NMR (121 MHz, $CDCl_3$) 20.5 (1P, s). $^1$H NMR (400 MHz, $CDCl_3$) δ 5.70-5.56 (2H, m), 3.60 (1H, dd, J=14.6 Hz, 10.5 Hz), 3.42 (3H, dd, J=13.4 Hz, 9.9 Hz), 3.23-3.12 (1H, br m), 2.97-2.81 (3H, br m), 2.40-2.26 (1H, br m), 2.20-1.97 (3H, br m), 1.90-1.51 (20H, br m), 1.48-1.36 (1H, br m), 1.35-1.03 (15H, br m). HRMS (ESI) m/z calculated for $C_{26}H_{50}N_4P^+$ ($M^+$) 449.3770. found 449.3773.

Preparation of Tris[cyclohexyl(methyl)amino]-cycloctenyl(methyl)amino-phosphonium tetrafluoroborate. In a 100 mL round bottom flask equipped with a magnetic stir bar, tris(cyclohexylamino)-cycloctenylamino-phosphonium tetrafluoroborate (3.00 g, 5.59 mmol) was combined with chlorobenzene (20 mL) and 17.9 g of a 50% NaOH solution (by weight). Dimethyl sulfate (2.65 mL, 27.9 mmol) was added in a cautious manner by syringe as the reaction is somewhat exothermic. After the addition of dimethyl sulfate the temperature of the reaction flask was monitored until it returned to ambient temperature at which time the reaction flask was placed in an oil bath at 70° C. for 8 h. Upon cooling the mixture to room temperature, 150 mL of water was added. The reaction mixture was extracted using wet $CH_2Cl_2$ (2×100 mL) and the combined organic extracts were washed with water (100 mL), dried with $Na_2SO_4$ and the $CH_2Cl_2$ was removed by rotary evaporation. The resultant oil was precipitated into 300 mL of diethyl ether. The white solid was collected on a Buchner funnel and residual solvent was removed at 80° C. in vacuo. The crude product was redissolved in $CH_2Cl_2$ (100 mL) and washed with aqueous 1M $NaBF_4$ (2×50 mL). The $CH_2Cl_2$ solution was concentrated and dripped into 300 mL of diethyl ether. The crude solid was collected on a Buchner funnel, dried in vacuo, dissolved in a minimal amount of $CHCl_3$ and dried in vacuo at 80-90° C. to remove residual solvents. The white solid was obtained in 82% yield (2.7 g). $^{31}$P {$^1$H NMR} NMR (121 MHz, $C_6D_6$) δ5.6 (1P, br s). $^1$H NMR (400 MHz, $CDCl_3$) δ 5.79-5.70 (1H, br m), 5.79-5.70 (1H, br m), 5.63-5.54 (1H, br m), 3.39-3.27 (1H, br m), 3.03-2.88 (3H, br m), 2.69-2.56 (12H, br m), 2.43-2.30 (1H, br m), 2.26-1.95 (4H, br m), 1.93-1.40 (25H, br m), 1.38-1.16 (7H, br m), 1.15-0.99 (3H, br m). HRMS (ESI) m/z calculated for $C_{30}H_{58}N_4P^+$ ($M^+$) 505.4402. found 505.4399. Anal. Calc. for $C_{30}H_{58}B_1F_4N_4P_1$: C, 60.80; H, 9.87; N, 9.45. Found C, 60.78; H, 9.99; N, 9.49.

Preparation of Tris[cyclohexyl(methyl)amino]-cycloctenyl(methyl)amino-phosphonium chloride. This compound was obtained by dissolving tris[cyclohexyl(methyl)amino]-cycloctenyl(methyl)amino-phosphonium tetrafluoroborate (2.804 g, 4.73 mmol) in methanol and treating it with 30 g of ion exchange resin (Amberlite-IRA 400(Cl) form). The resin was filtered off and washed with methanol. The filtrate was rotary evaporated and immediately dissolved in $CH_2Cl_2$. The solution was washed twice with water, rotary evaporated and subsequently dried in vacuo at 80° C. affording a white solid in 88% yield (2.25 g).

Polymerizations.

In general, polymerization may be accomplished by ROMP as discussed above. Either the phosphazenium monomer maybe polymerized as a homopolymer, or it may be copolymerized with a monomer precursor for an HRU. Monomer precursors of HRU in ROMP are well-known in the art. In the particular case of the instant invention, the monomer can be an aliphatic ($C_1$-$C_{20}$)hydrocarbon containing at least one double bond in a carbocycle. Polymers can be created in which all repeating units are PRU; polymers can be created in which there are PRU and HRU; and polymers can be created in which some of the HRU are cross-linking HRUs. To make the class of cross-linked polymers in which the cross link is through the HRU, a monomer may be added in which the aliphatic hydrocarbon contains a double bond in each of two carbocycles:

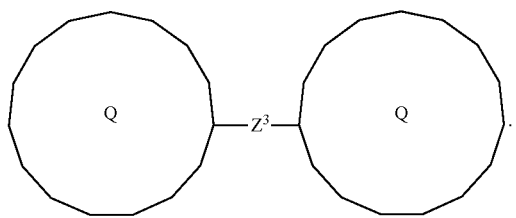

By the same token, polymers can be created in which some or all PM contain multiple cycloalkene $R^3$ groups; this will result in cross-linking through the PRU.

Other methods of polymerization may also be employed. For example, free-radical polymerization of amino-substituted styrene can provide a polystyrene in which the amino group can be further elaborated as described for cyclooctene above to provide phosphazenium polymers in which $Z^1$ is phenylene and W and Y are alkylene. Similarly, one may polymerize or copolymerize a haloolefin according to the method of Bruzard et al. [Macromol. Chem. Phys. 198, 291-303 (1997)] and then react with the phosphazene described by Schwesinger [Chem. Ber 127, 2435-24-54 (1994)]:

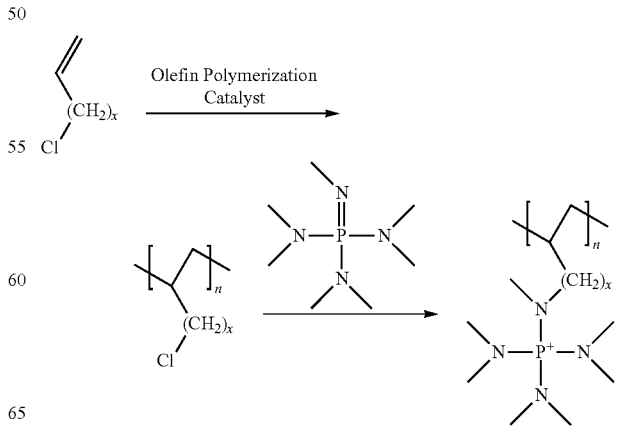

to provide polymers with a straight-chain alkylene backbone.

In a specific embodiment, monomer was combined with cyclooctene (COE) in the presence of Grubbs $2^{nd}$ generation catalyst (Ru) in chloroform. $^1$H NMR spectroscopy of the polymerization indicated that COE is incorporated into the growing polymer chain more readily than the cationic monomer. Thus, the polymerization strategy could afford block copolymer type structures. However, as the metathesis process is in equilibrium, long reaction times can lead to statistical mixtures of the monomers in the resultant polymer chains. The polymerization reaction was conducted for a minimum of 18 hours, at which point hydrogenation of the unsaturated copolymer was accomplished using Crabtree's catalyst ([(COD)Ir(Py)(PCy$_3$)]PF$_6$) and hydrogen gas (600 psi). Greater than 99% hydrogenation was achieved within 17 h as confirmed by the near complete disappearance of olefinic signals in the $^1$H NMR spectrum, yielding a phosphazenium-functionalized polyethylene. The product hydrogenated copolymer is in the chloride form.

Preparation of the Saturated Copolymer with 17 mol % PRU: Under a nitrogen atmosphere Tris[cyclohexyl(methyl)amino]-cyclooctenyl(methyl)amino-phosphonium chloride (0.4 g, 0.74 mmol) and COE (0.4 g, 3.63 mmol) were combined and dissolved in chloroform (2.0 mL). To the reaction mixture, Grubbs' $2^{nd}$ Generation catalyst (3.8 mg, 0.0043 mmol) dissolved in 1.0 mL of chloroform was added and the solution was stirred vigorously. The reaction mixture became a swollen gel in a matter of minutes. The reaction was conducted for a minimum of 17 hours. The unsaturated copolymer was then dissolved in a 1:1 chloroform/methanol cosolvent (20 mL) forming a yellow solution. The polymer solution and Crabtree's catalyst (14.3 mg, 0.0178 mmol) were combined in a Parr reactor and sealed. It was pressurized to 600 psig hydrogen and then vented down to 50 psig. This process was repeated twice more to purge the reactor of air, then pressurized to 600 psig and heated to 55° C. with rapid stirring. After 17 hours, it was cooled, vented and the swollen polymer gel dried under vacuum at 90° C. The polymer was subsequently washed with chloroform and dried again under vacuum at 90° C. furnishing a yellow solid (0.739 g, 92%). The $^1$H NMR spectrum suggests greater than 99% of the alkene units have been hydrogenated.

Preparation of a membrane containing 17% PRU (AAEM-17): The saturated copolymer with 17 mol % PRU (200 mg) was dissolved in a 1,2-dichloroethane/ethanol cosolvent mixture (8 mL) forming a light yellow solution and then transferred to a preheated (45° C.) glass dish (diameter of 5.25 cm and depth of 3.0 cm) on top of a hot plate covered with a metal plate to ensure uniform heating. The dish was covered with a round glass cover with a diameter of 7 cm and volume of 550 mL bearing one Kontes glass valve on top to control the rate of solvent evaporation. After a minimum of 4 hours the cover was removed and the temperature was increased to 80° C. for another hour. Following this, water was added and the translucent film freely removed from the dish. The AAEM was generated by immersing the film in a 1 M KOH solution as described above.

When [P(N(Me)Cy)$_4$]BF$_4$ was dissolved in a mixture of CD$_3$OD, NaOD (1 M NaOD, [NaOD]/[P(NMeCy)$_4$]=10) and an internal standard, no degradation was observed over a 20 d period at 80° C. as shown by $^{31}$P NMR and $^1$H NMR spectroscopy. This lack of degradation in an alcohol solvent is remarkable and suggests that the AAEM's made as described herein will offer significant advantages in methanol or ethanol fuel cells.

The invention claimed is:

1. A polymer comprising a plurality of phosphazenium-containing repeating units (PRU) of formula

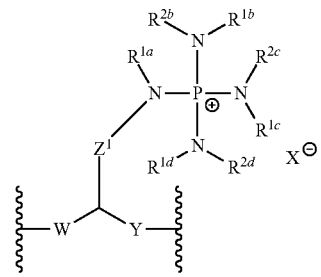

wherein $R^{1a}$, $R^{1b}$, $R^{1c}$, $R^{1d}$ (collectively $R^1$) and $R^{2b}$, $R^{2c}$ and $R^{2d}$ (collectively $R^2$) are independently chosen from H, (C$_1$-C$_{15}$)alkyl, (C$_5$-C$_{10}$)cycloalkyl and a point of attachment to a bivalent (C$_1$-C$_{20}$)hydrocarbon residue; or taken together, any pair of $R^1$, $R^2$ form a 5 or 6-membered ring;

W is a direct bond or (C$_1$-C$_{10}$)hydrocarbon;

Y is a direct bond or (C$_1$-C$_{10}$)hydrocarbon;

$Z^1$ is a direct bond;

wavy lines indicate the points of attachment to adjacent repeating units of the polymer, and X is any counterion.

2. A polymer according to claim 1 wherein W is a direct bond or (C$_1$-C$_{10}$)alkylene;

Y is a direct bond or (C$_1$-C$_{10}$)alkylene.

3. A polymer according to claim 1 wherein all $R^1$ are methyl and all $R^2$ are chosen from (C$_1$-C$_{10}$)alkyl, (C$_5$-C$_{10}$)cycloalkyl and a point of attachment to a bivalent hydrocarbon residue.

4. A polymer according to claim 3 wherein from one to three $R^2$ are points of attachment to a bivalent hydrocarbon residue and the remainder of $R^2$ are chosen from cyclopentyl, cyclohexyl and t-butyl.

5. A polymer according to claim 4 wherein one or two of $R^2$ are points of attachment to a bivalent hydrocarbon residue and the remainder are cyclohexyl.

6. A polymer according to claim 1 wherein said bivalent hydrocarbon residue is of formula:

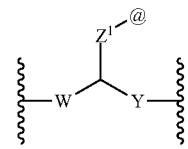

wherein

W is a direct bond or (C$_1$-C$_{10}$)hydrocarbon;

Y is a direct bond or (C$_1$-C$_{10}$)hydrocarbon;

$Z^1$ is a direct bond;

@ is the point of attachment to a nitrogen of phosphazenium; and wavy lines indicate the points of attachment to adjacent repeating units of the ionomer.

7. A polymer according to claim 2 wherein W is (CH$_2$)$_{1-5}$ and Y is (CH$_2$)$_{1-5}$.

8. A polymer according to claim 1 additionally comprising a plurality of HRU of formula:

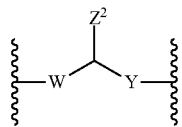

wherein
W is independently chosen from a direct bond and $(C_1-C_{10})$hydrocarbon;
Y is independently chosen from a direct bond and $(C_1-C_{10})$hydrocarbon;
$Z^2$ is hydrogen or $(C_1-C_{10})$hydrocarbon; and
wavy lines indicate the points of attachment to adjacent repeating units of the ionomer.

9. A polymer according to claim 8 additionally comprising a plurality of crosslinking repeating units.

10. A polymer according to claim 9 wherein said crosslinking repeating units are of formula:

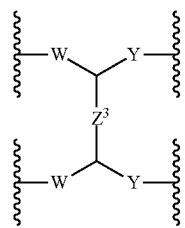

wherein $Z^3$ is a $(C_1-C_{20})$hydrocarbon.

11. A polymer according to claim 10 wherein $Z^3$ is phenylene or $(CH_2)_{1-20}$.

12. A membrane comprising a polymer according to claim 1.

* * * * *